United States Patent [19]

Jehle

[11] Patent Number: 4,980,565
[45] Date of Patent: Dec. 25, 1990

[54] ELECTRO-OPTICAL TARGET ACQUISITION SYSTEM

[75] Inventor: Robert E. Jehle, Silver Spring, Md.

[73] Assignee: The United States of America as represented by the Secretary of the Navy, Washington, D.C.

[21] Appl. No.: 390,441

[22] Filed: Aug. 16, 1973

[51] Int. Cl.$^5$ .................... G02B 26/10; G02B 23/02
[52] U.S. Cl. ................................ 250/334; 250/332; 250/333; 350/539; 350/540; 352/69
[58] Field of Search ............... 250/338, 330, 331, 332, 250/333, 334; 178/7.3 D, 7.5 D, 7.6, 6.8, DIG. 8; 350/21, 22, 23, 539, 540; 352/69

[56] References Cited

U.S. PATENT DOCUMENTS 3,715,497 2/1973 Cooper et al.
3,781,559 12/1973 Cooper et al. .................. 250/334

Primary Examiner—Stephen C. Buczinski
Attorney, Agent, or Firm—Kenneth E. Walden

[57] ABSTRACT

An electro-optical target acquisition system having a scanning mirror which rotates through a 360° azimuthal plane. The infrared (IR) signal of a target is reflected off a mirror and imaged by a lens through an optical derotator onto a linear array of IR detectors. The detectors produce a current proportional to the strength of the IR signal. The current of each detector channel is amplified and fed to a corresponding light emitting diode, LED, that is part of a linear array of diodes. This light is imaged by a coupling lens through an optical rotator onto the photosurface of an image intensifier tube. The light image of the LED's creates a corresponding electron image. The electron image is swept across the tube and impinges onto the tube's phosphor output plate and creates a light output. The light output is an intensified image of the LED's.

19 Claims, 3 Drawing Sheets

OUTPUT FACE OF IMAGE TUBE

ELECTRO-OPTICAL TARGET ACQUISITION SYSTEM

BACKGROUND OF THE INVENTION

The present invention relates generally to infrared scanning systems and more specifically to infrared target acquisitions systems for detecting heat producing bodies.

Surveillance systems have been of prime importance to the Navy in both detecting and recognizing enemy and friendly ships and aircraft. Numerous methods and devices have been developed to accomplish these ends. For example, complex monopulse radar systems have been developed that operate at X-band frequencies which can distinguish minute detail of targets at great distances. However, these systems often require expensive computer processing equipment to process the high frequency signals for display. In addition, the monopulse hardware is extremely complex and expensive.

Infrared scanning systems have also been used to detect targets. Basically two types have been known to the prior art. One type uses a linear array of detectors located along the elevation axis which are electronically scanned as they are mechanically rotated in the azimuthal plane. This electronically scanned data is then fed to a television monitor at a remote location for viewing in real time. The great advantage of the infrared scanners over radar apparatus giving similar results is that they are relatively inexpensive in comparison, while still giving detailed target information in nonvisible conditions, e.g., night, fog, etc., at moderate distances. The other type uses a linear array of detectors connected to light emitting diodes (LED's) which are subsequently scanned by a television camera which transmits the picture to a television monitor at a remote location. These systems however, show only a narrow sector of the azimuthal plane at any given instant of time. It is desirable to display the entire 360° azimuthal plane at once so that the viewer can search a much larger volume of space. To display the entire azimuthal plane simultaneously, a system with a much larger signal bandwidth is necessary to be compatible with the flicker fusion rate of the human eye, the bandwidth of the prior art infrared systems would allow scanning rates of only about one per second where the flicker fusion rate requires at least 30 scans per second. Although it is possible to trick the eye through different techniques, i.e., flashing a non-refreshed frame twice before presenting a second frame, placing large amounts of memory into the display, etc., rotating of the scanning head at large angular rates has been explored instead.

One of the problem areas in driving a system at large angular rates is how to pick off the signals from each detector in the array. Normally a mechanically rotating system uses slip rings to accomplish this objective. However the use of a large number of slip rings, one for each channel, in a rapidly rotating system would introduce noise and mechanical problems that are best avoided.

Additionally, the use of slip rings resigns the designer to rotating not only the optics but all the electronic preamp circuits and the detector/cooler assembly at these high rates. It was decided therefore to seek another solution.

Another problem arising out of such a system is how to display, in real time, all the information gathered. A cursory examination of the bandwidth requirements will show, that the display must be capable of handling several hundred megahertz. Bandwidth considerations alone rule out the use of a conventional CRT display. A multigun CRT was considered. However even a ten gun CRT is inadequate to handle the required bandwidth.

SUMMARY OF THE INVENTION

These limitations and disadvantages are overcome by the present invention which rapidly scans infrared radiation in a 360 degree azimuthal plane to produce an image on an image intensifier tube. The invention uses a rotating scanning head which transmits the infrared radiation into a derotator which makes the image stationary for projection onto a linear array of infrared detectors. The detectors produce electrical signals which are amplified and transformed into visible light by a linear array of light emitting diodes. This light is rotated at the same angular velocity as the scanning head by an optical rotator and projected onto an image intensifier tube. The rotating image "paints or sweeps out" an annular picture on the phosphor output plate which represents the scanned azimuthal plane.

It is therefore the object of the present invention to provide an inexpensive and effective 360° infrared scanning device.

Another object of the invention is to provide an infrared scanning system with a large signal bandwidth.

Another object of the invention is to provide an effective and simple device for picking off the rotational signals of a high speed rotating scanner.

Another object of the invention is to provide a simple and effective device for displaying a 360° picture.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
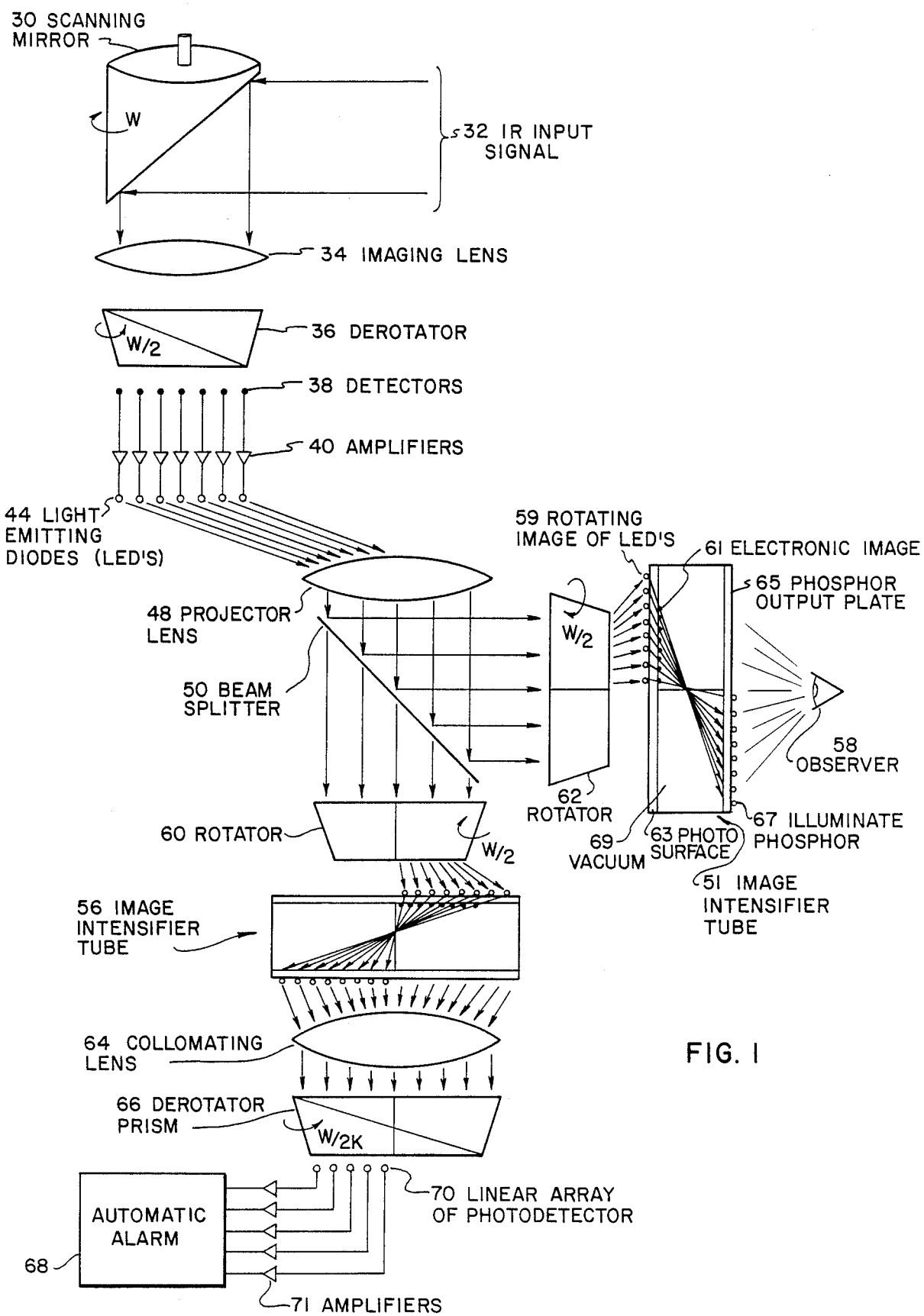
FIG. 1 is a diagram of the preferred embodiment.

FIG. 1 is a diagram of the disclosed target acquisition system in which scanning mirror 30 scans the 360 degree azimuthal plane and reflects incoming infrared (IR) radiation onto a derotator 36 through an imaging lens 34. Derotating prism 36 aligns the incoming IR signal with the linear array of IR detectors 38 which produce electrical signals that are amplified by amplifiers 40 and transmitted to a remote location to the light emitting diodes (LED's) 44. The light emitting diodes 44 produce visible light which varies proportionally with the magnitude of their input signal. This visible light is projected onto a beam splitter 50, via projector lens 48, forming two separate beams. One of the beams is projected onto rotator 62 which sweeps out an annular pattern on the photo surface 63 of image intensifier tube 51. The photo surface 63 produces an electronic image 61 of the LED's on the inside of tube 51 which is accelerated across the vacuum 69 of the tube. The electrons intersect phosphor output plate 65 producing an illuminated phosphor image which is intensified. As the image is rotated on the intensifier tube, it is integrated by the phosphors to produce a stationary annular image of the scanned 360 degree azimuthal plane.

The other beam is projected on a similar rotator 60 which paints or sweeps out a rotating image of LED's 44 on image intensifier tube 56 in the same manner as disclosed above. The annular image produced by the intensifier tube 56 is coupled by coupling lens 64 and projected onto a derotating prism 66 which has an angular velocity $$\left(\frac{a}{2}\right)\omega.$$

This differs from the velocity, $\omega/2$, needed to freeze the motion of intensified light from the LED's 44. Since the image through a prism rotates twice for each rotation of the prism, any divergence from an angular velocity of $\omega/2$ would cause progression of the image. The linear array of photodetectors 70 are thus scanned at an angular velocity controlled by the derotator prism 66.

Photodetectors 70 detect the scanned scene and produce electrical signals which are amplified by amplifiers 71 and fed to automatic alarm 68. Automatic alarm 68 produces an alarm signal whenever a certain threshold level has been exceeded. This occurs when a ship, plane, or other infrared producing vessel is sensed by the present device to cause the LED's to be activated and thereby producing a light signal at the alarm photodetectors.

Figure 2:
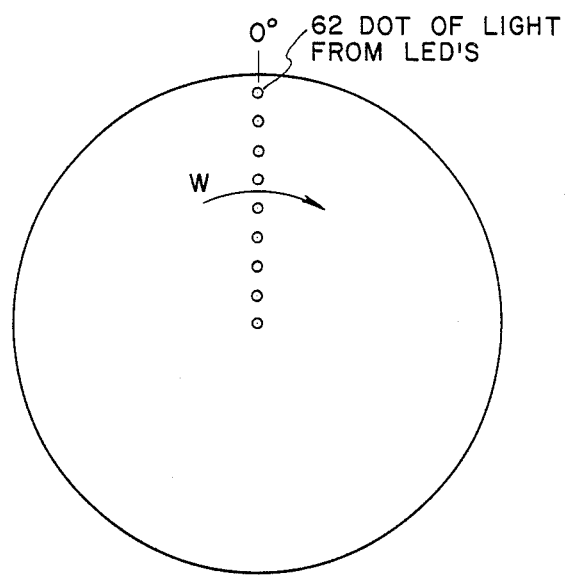
FIG. 2 is a diagram of the output face of an image intensifier tube.

FIG. 2 is a diagram of the face of an image intensifier tube. The dots of light 62 are closely spaced and rotated at an angular velocity $\omega$, caused by the rotation of the prisms at an angular velocity of $\omega/2$, to form an annular image of the 360 degree azimuthal plane.

Figure 3:
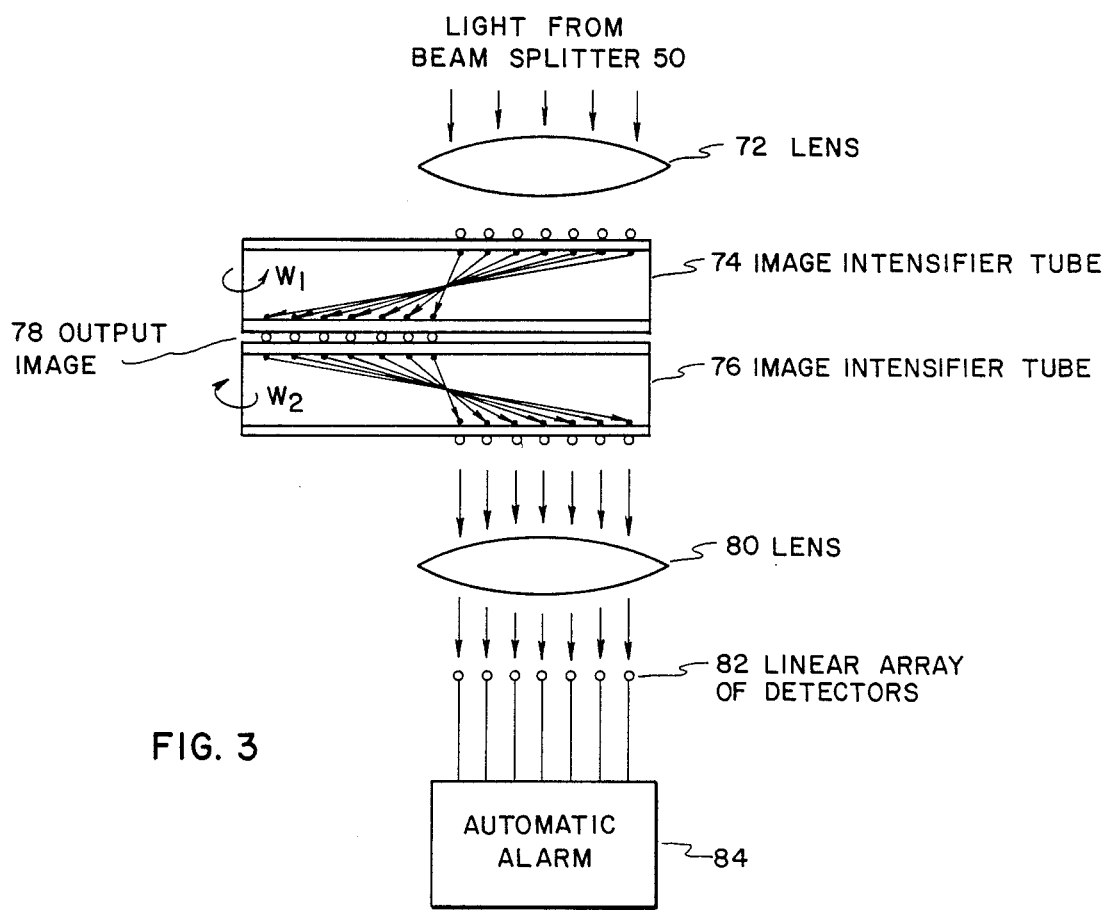
FIG. 3 is a diagram of an alternative acquisition device for use with the preferred embodiment.

FIG. 3 shows an alternative system to be used in conjunction with the device of FIG. 1 for automatically detecting planes, boats, or other IR producing bodies. The light from the beam splitter could instead be imaged directly onto an image intensifier tube 74 and rotated by means of a magnetic field or deflection plates at some angular velocity $\omega_1$. A second image intensifier tube 76 is then used to rotate the image in the opposite direction at some angular velocity $\omega_2$. The first tube 74 sweeps out an annular picture of the scanned plane on its output face while the second tube 76 scans that picture and projects it onto detectors 82 via lens 80 to activate an alarm 84 in the same manner described above.

Figure 4:
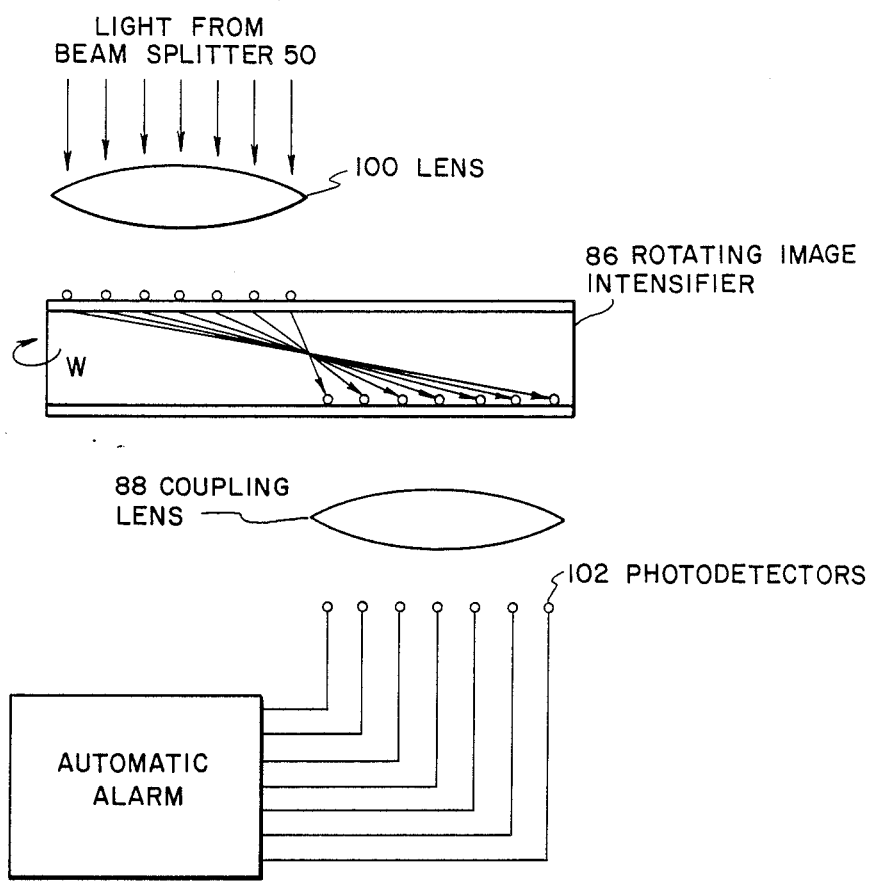
FIG. 4 is a diagram of an additional alternative acquisition device for use with the preferred embodiment.

FIG. 4 shows an additional alternative system to be used in conjunction with the device of FIG. 1 for automatically detecting planes, boats and other IR producing bodies. Light from the beam splitter 50 is imaged directly onto a rotating image intensifier 86 via lens 100. The image intensifier acts to intensify the image brightness. It is rotated so that the election image will be continuously presented with "fresh" phosphors to properly reflect their true rate of change in intensity. This image is projected onto photodetectors 102 via coupling lens 88 and the alarm activated in the same manner as previously described.

One advantage of this invention over previous systems is the amount of information that can be collected and the method of displaying this information. Other methods use a multiplexing scheme which normally terminates at a CRT display. The CRT has a small bandwidth that limits the amount of data that can be handled and the rate at which it can be displayed. The image intensifier tubes used in this invention can handle many more bits of information at higher rates that the CRT. The bandwidth that can be handled by this system is at least two orders of magnitude greater than conventional systems. In addition, the use of an automatic acquisition scheme saves the operator from continuously scanning the optical display for other craft.

Obviously many modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. A target acquisition system comprising:
    means for scanning infrared light in a 360 degree azimuthal plane;
    means for converting said infrared light into a stationary linear array of visible light;
    means for dividing said visible light into a first and second beam;
    means for sweeping out and intensifying said first beam to form a first annular pattern for visual observation;
    means for sweeping out and intensifying said second beam to form a second annular pattern;
    means for detecting a portion of said second annular pattern; and,
    threshold means for producing an alarm signal to indicate the presence of a target whenever the intensity of said detected portion of said second annular pattern exceeds a threshold level.

2. The device of claim 1 wherein said means for sweeping out said first annular pattern comprises a rotating prism.

3. The device of claim 1 wherein said means for intensifying said first beam comprises an image intensifier tube.

4. The device of claim 2 wherein said means for intensifying said first beam comprises an image intensifier tube.

5. The device of claim 1 wherein said means for sweeping out said second annular pattern comprises a rotating prism.

6. The device of claim 1 wherein said means for intensifying said second beam comprises an image intensifier tube.

7. The device of claim 5 wherein said means for intensifying said second beam comprises an image intensifier tube.

8. The device of claim 2 wherein said means for sweeping out said second annular pattern comprises a rotating prism.

9. The device of claim 3 wherein said means for sweeping out said second annular pattern comprises a rotating prism.

10. The device of claim 4 wherein said means for sweeping out said second annular pattern comprises a rotating prism.

11. The device of claim 2 wherein said means for intensifying said second beam comprises an image intensifier tube.

12. The device of claim 3 wherein said means for intensifying said second beam comprises an image intensifier tube.

13. The device of claim 4 wherein said means for intensifying said second beam comprises an image intensifier tube.

14. The device of claim 2 wherein said means for intensifying said second beam comprises an image intensifier tube.

15. The device of claim 3 wherein said means for intensifying said second beam comprises an image intensifier tube.

16. The device of claim 4 wherein said means for intensifying said second beam comprises an image intensifier tube.

17. The device of claim 1 wherein said means for converting said infrared light into a stationary linear array of visible light comprises a derotator prism.

18. The device of claim 2 wherein said means for converting said infrared light into a stationary linear array of visible light comprises a derotator prism.

19. The device of claim 2 wherein said means for converting said infrared light into a stationary linear array of visible light comprises a derotator prism.

* * * * *